Figure 1:
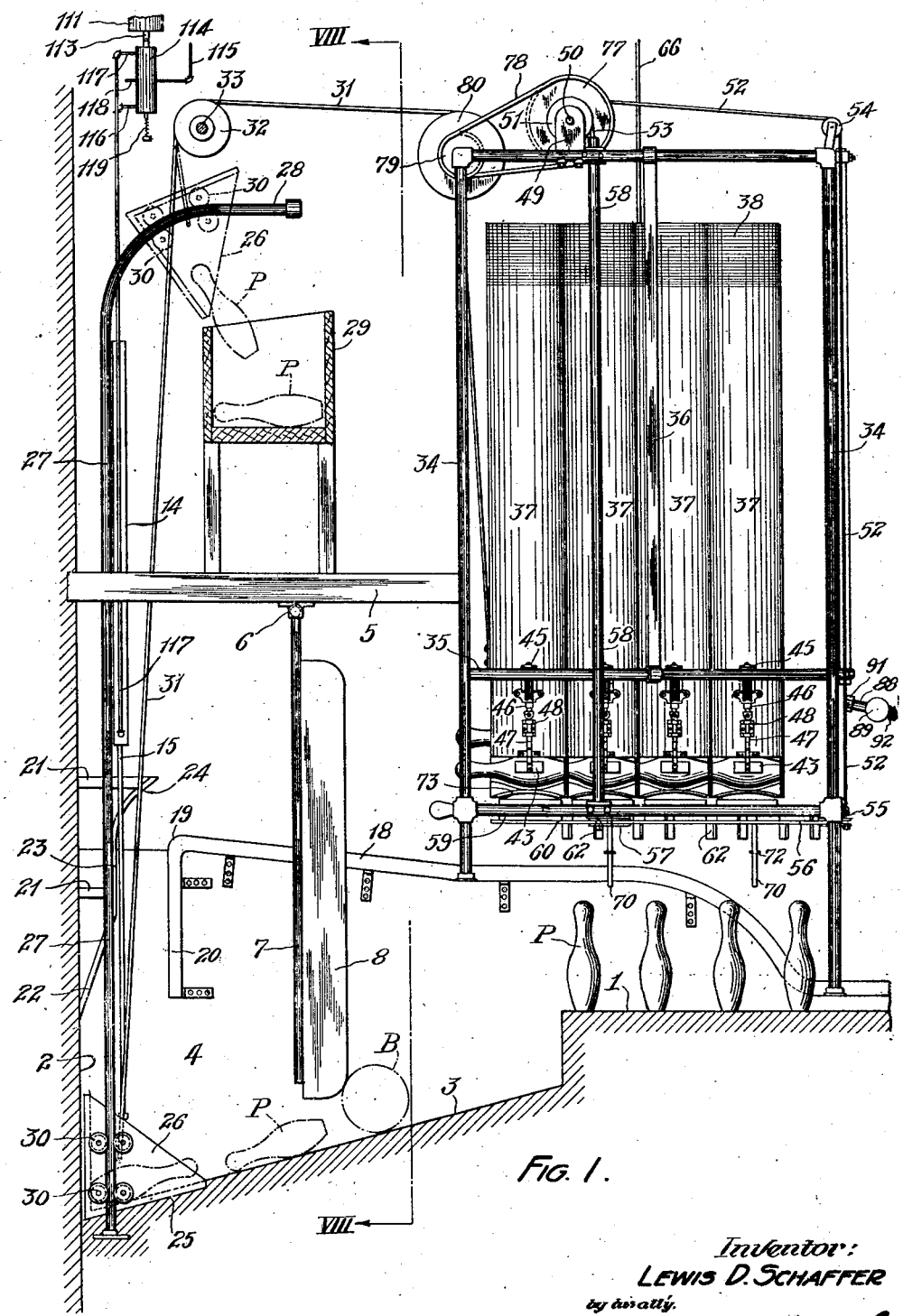

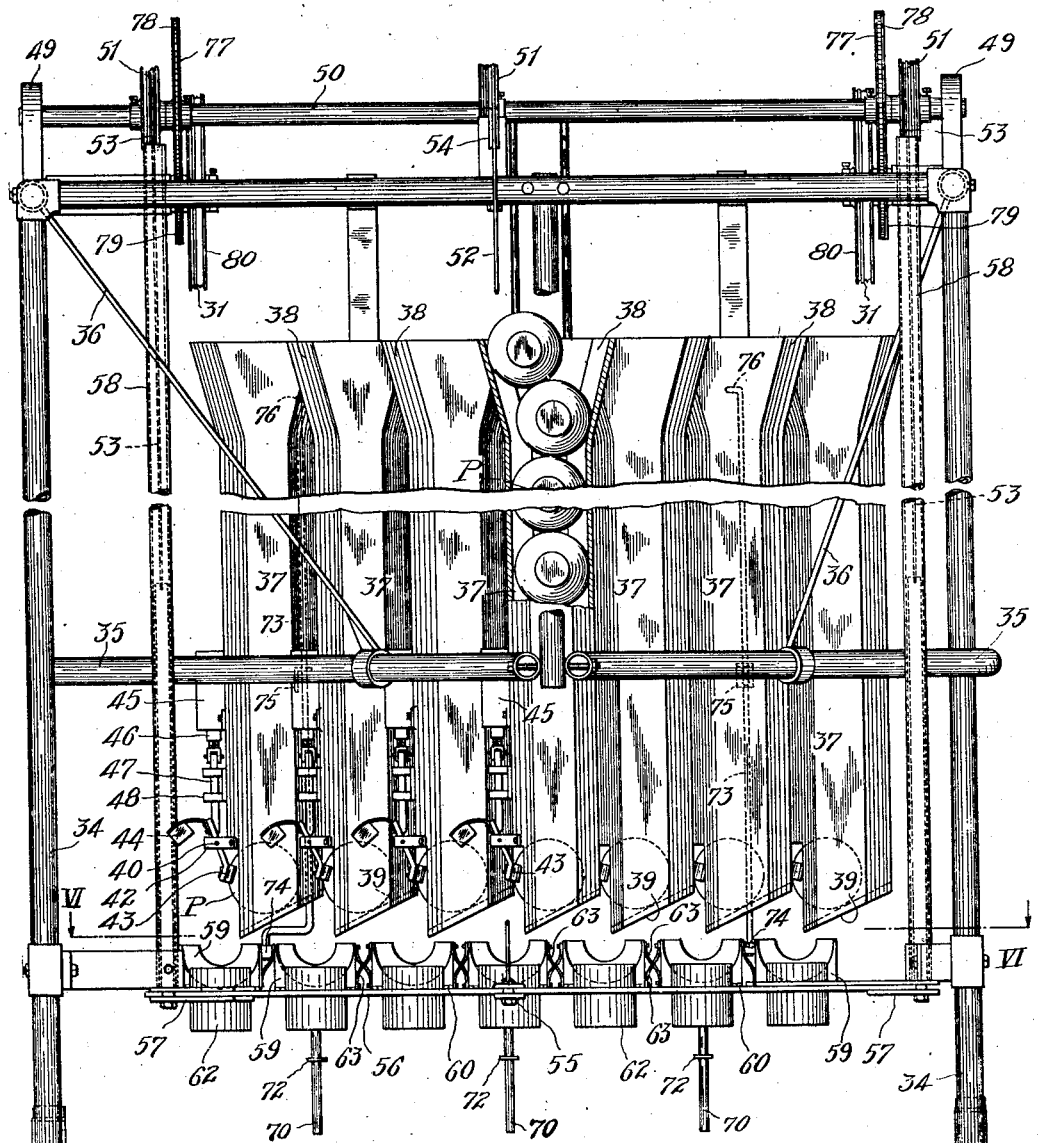
FIG. II.

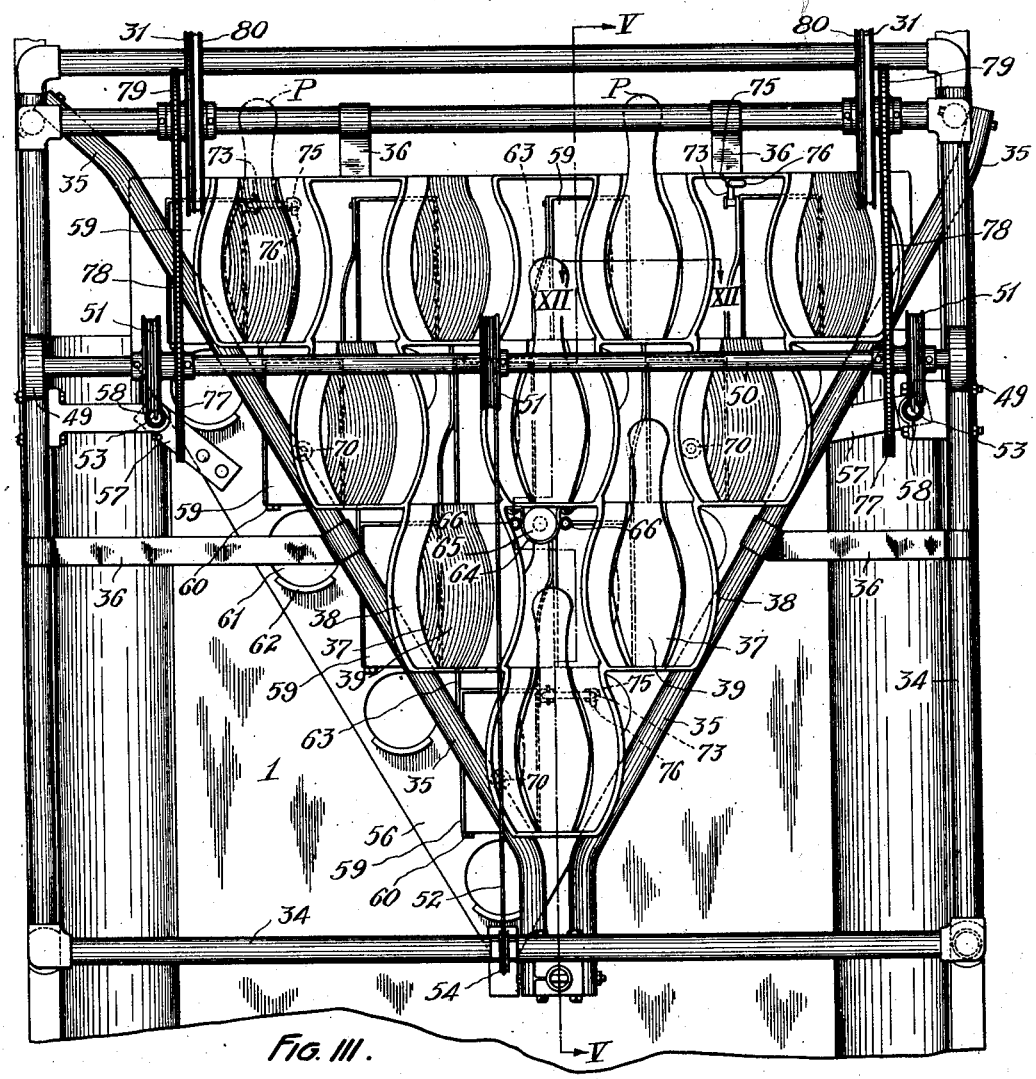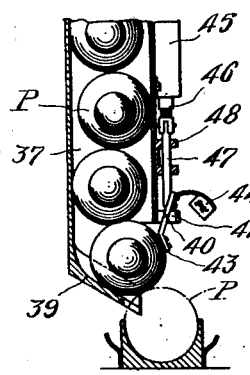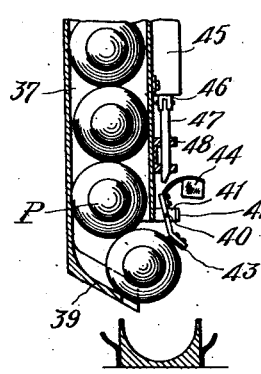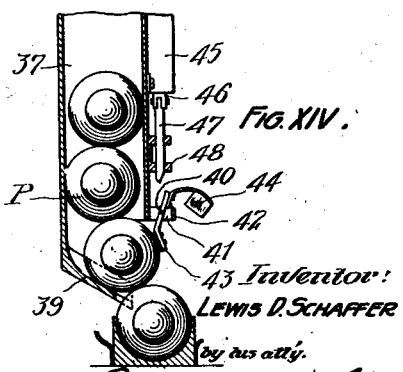

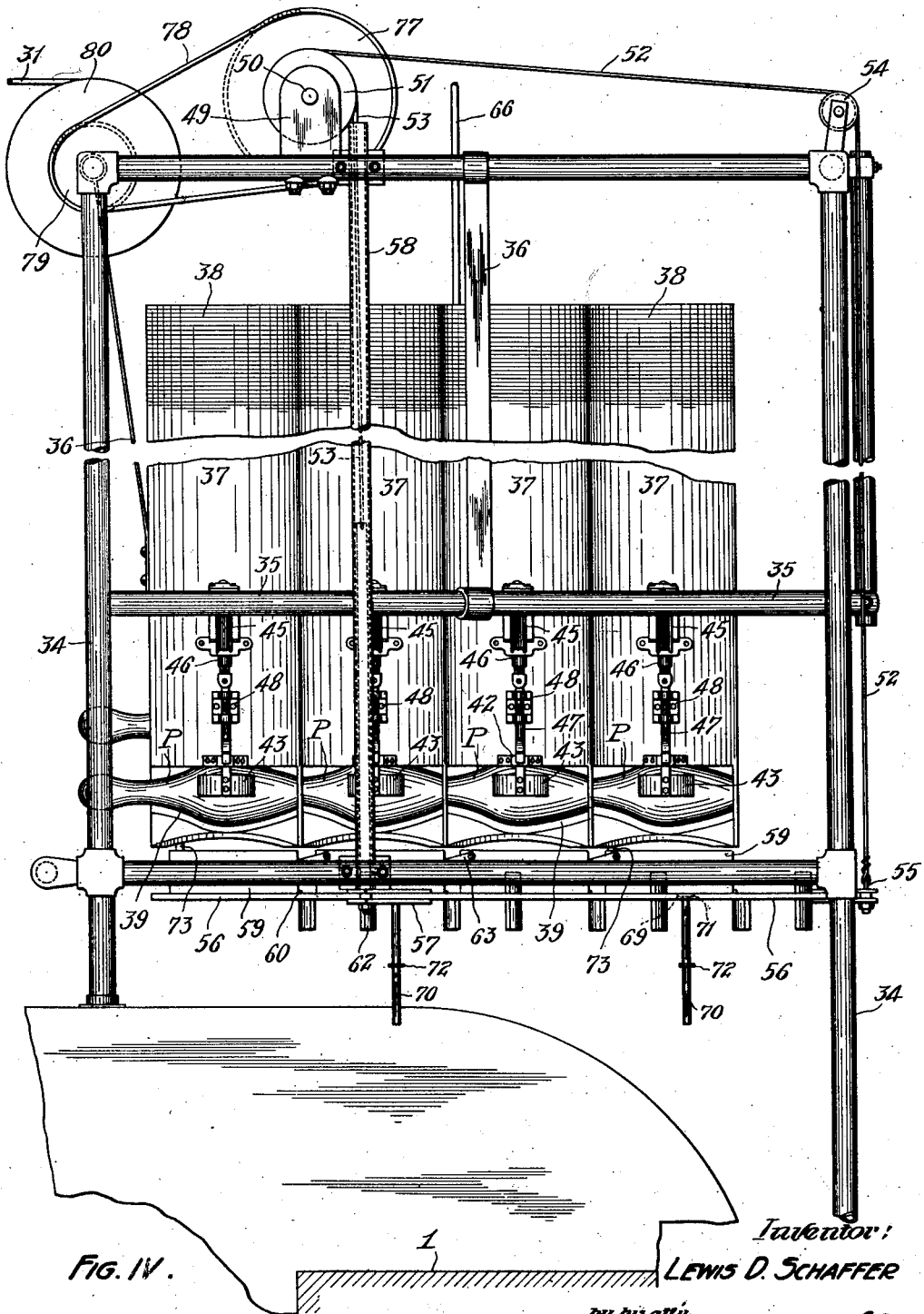

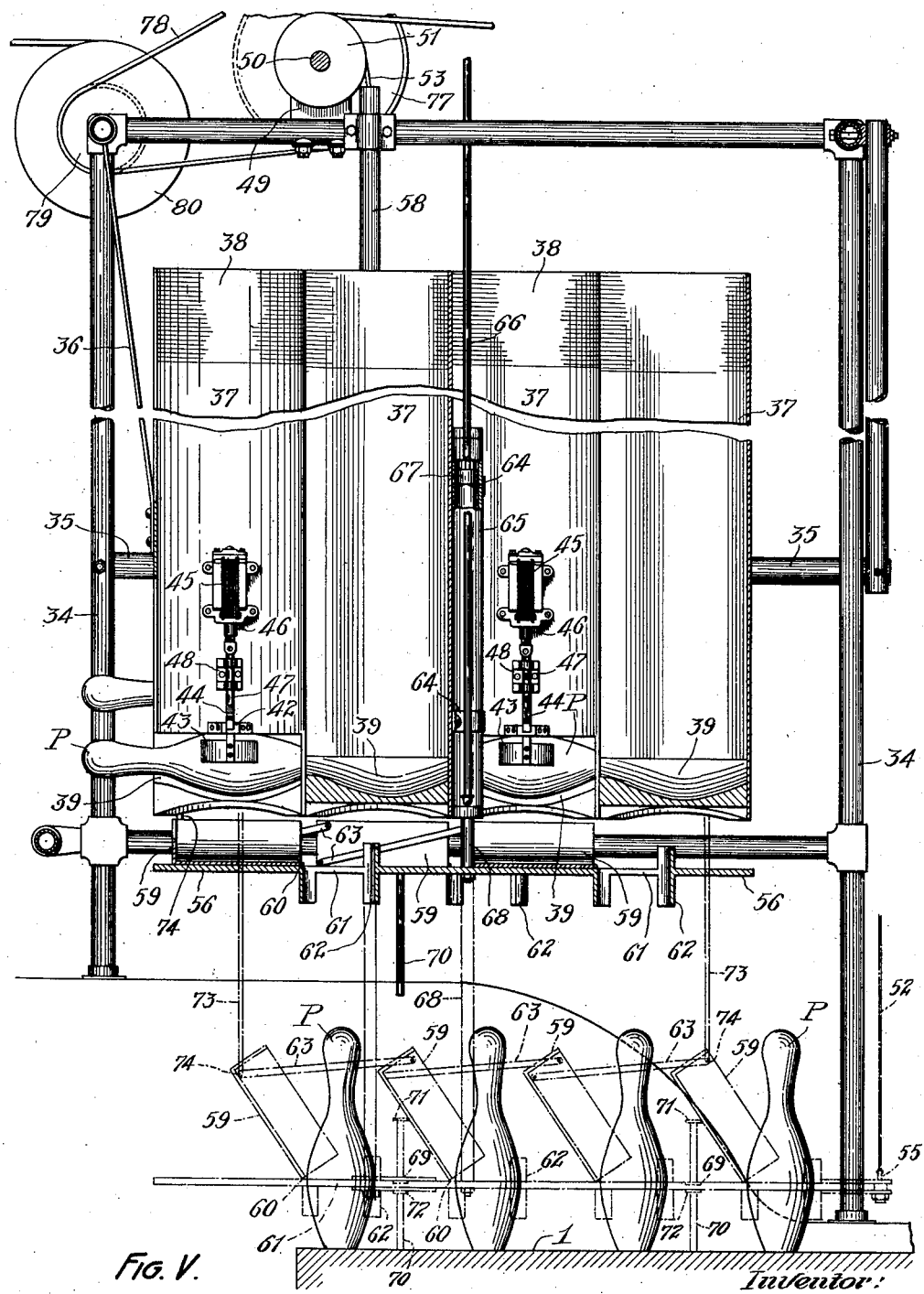
Fig. V.

May 3, 1927.  1,627,414
L. D. SCHAFFER
BOWLING PIN SETTING APPARATUS AND ITS METHOD OF OPERATING
Filed May 11, 1922  10 Sheets-Sheet 6
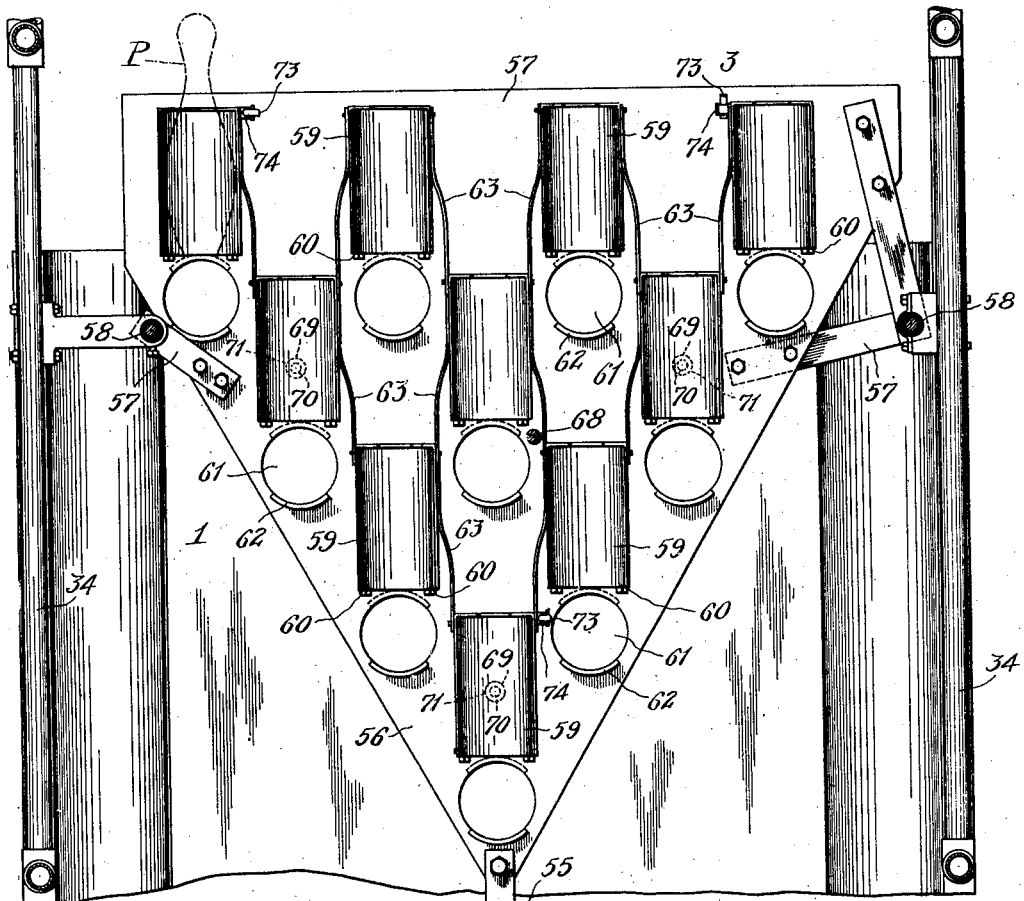
FIG. VI.
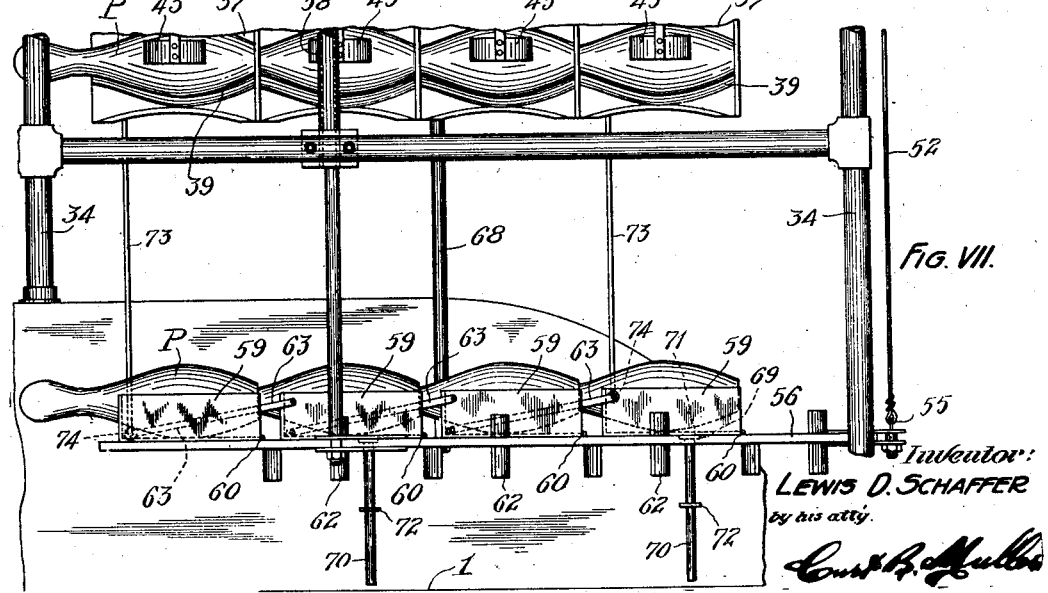
FIG. VII.
Inventor:
LEWIS D. SCHAFFER
by his atty.

May 3, 1927.
L. D. SCHAFFER
1,627,414
BOWLING PIN SETTING APPARATUS AND ITS METHOD OF OPERATING
Filed May 11, 1922    10 Sheets-Sheet 7
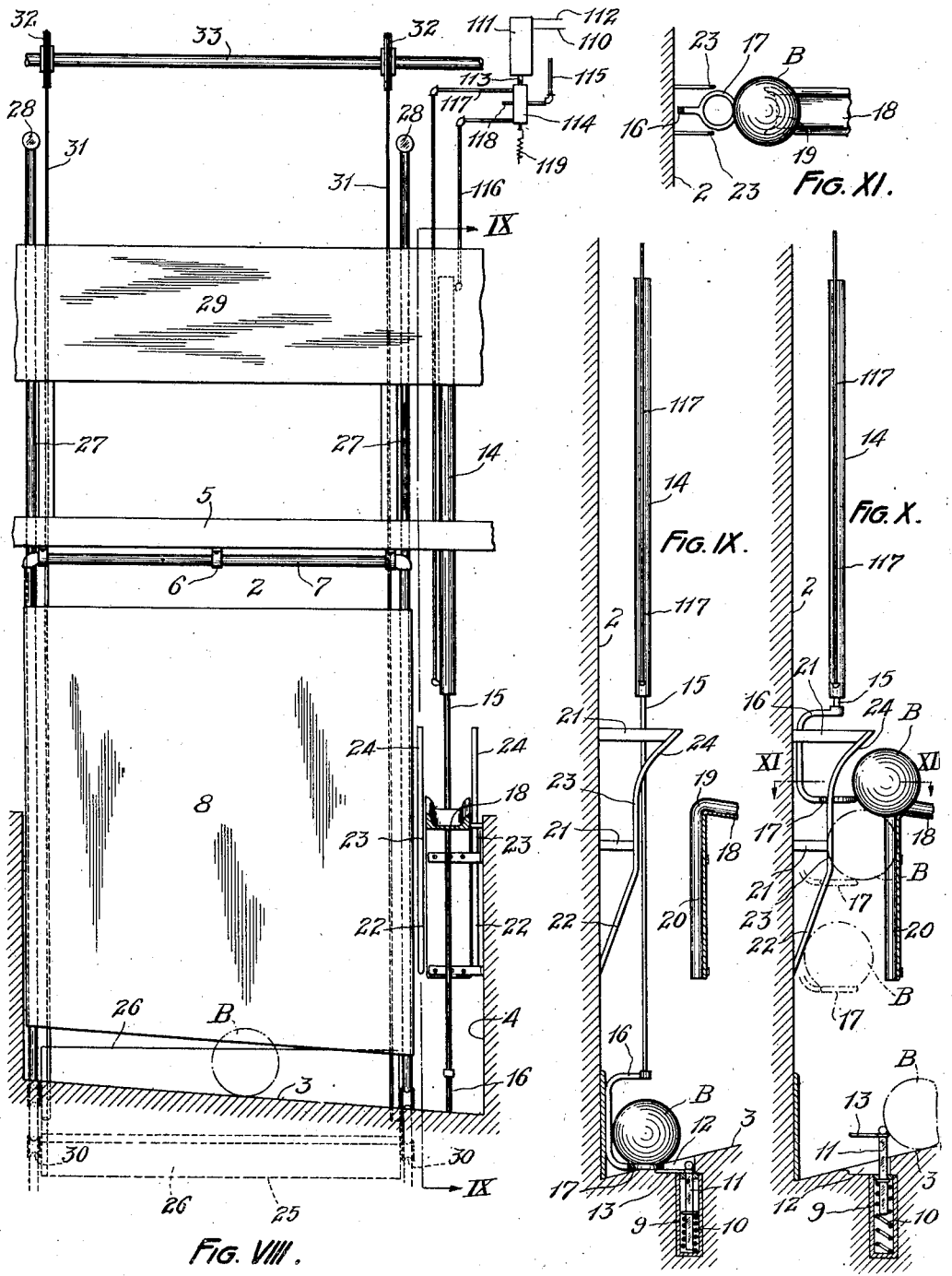
Inventor:
LEWIS D. SCHAFFER
by his atty.

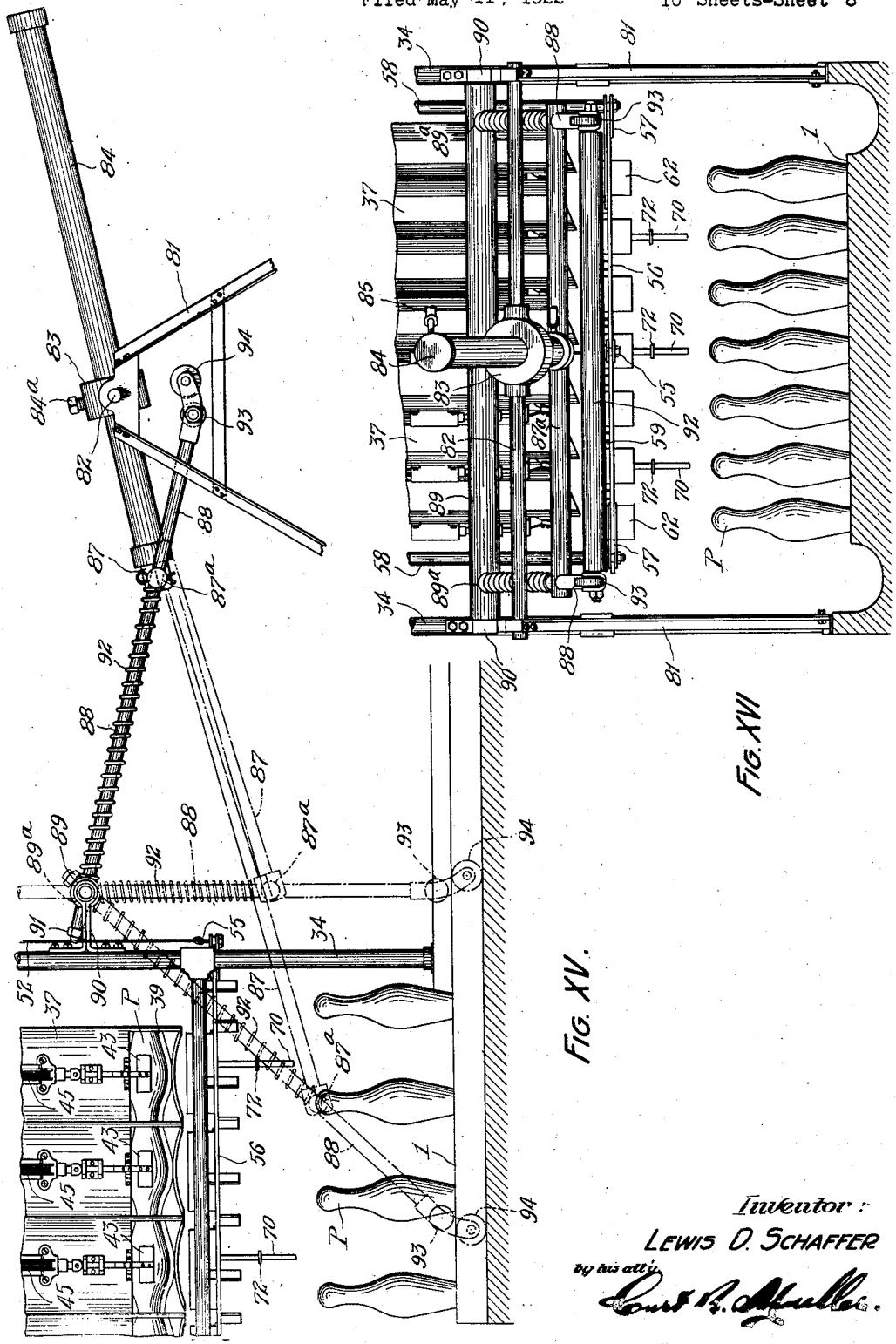

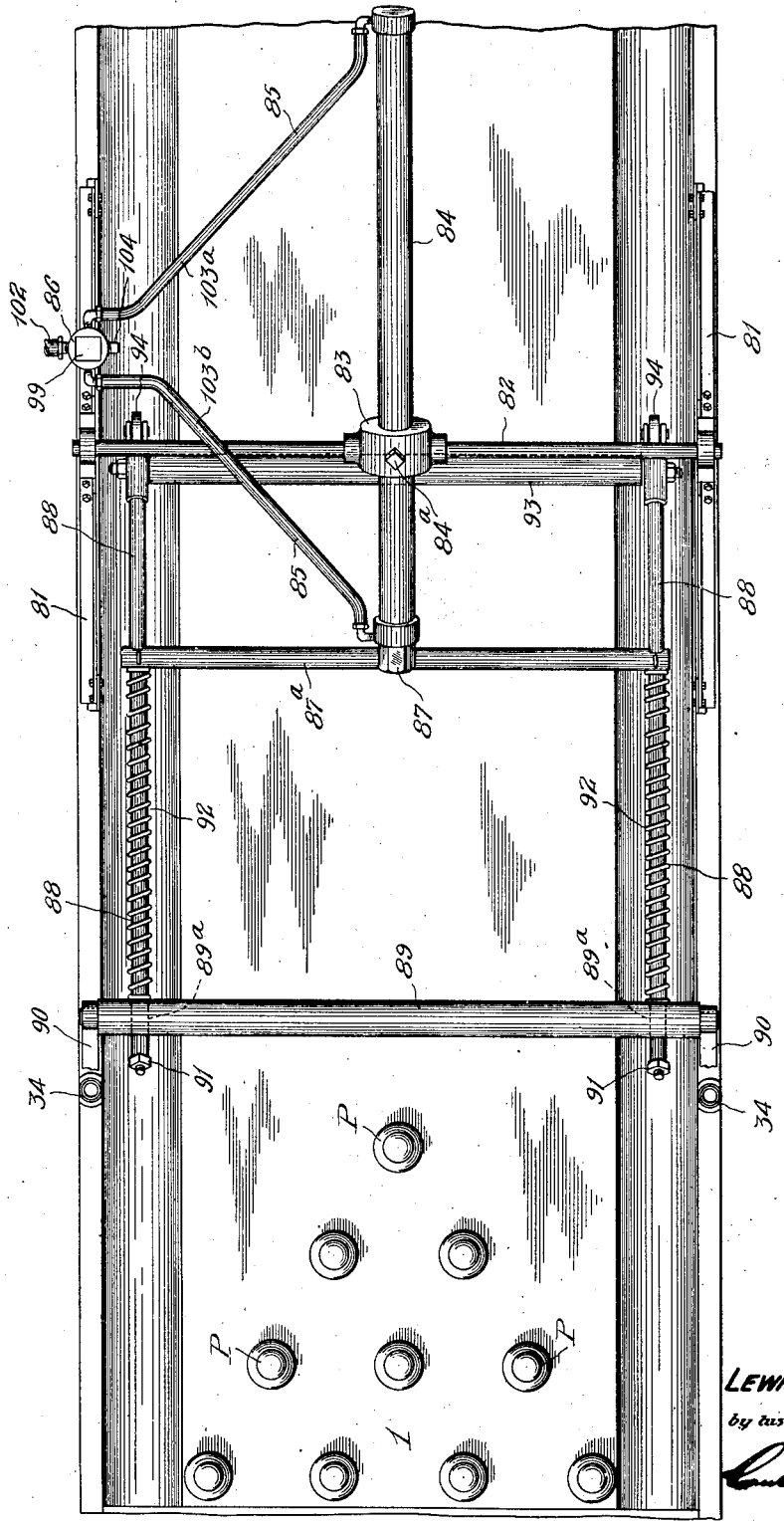

May 3, 1927.
L. D. SCHAFFER
1,627,414
BOWLING PIN SETTING APPARATUS AND ITS METHOD OF OPERATING
Filed May 11, 1922     10 Sheets-Sheet 10
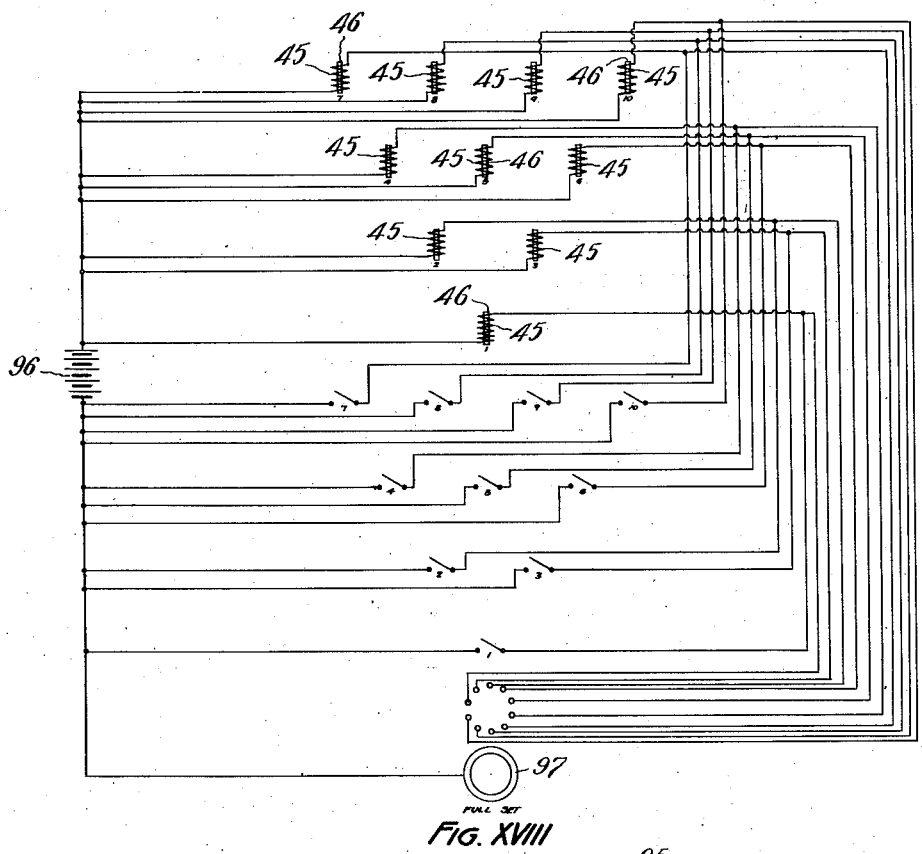
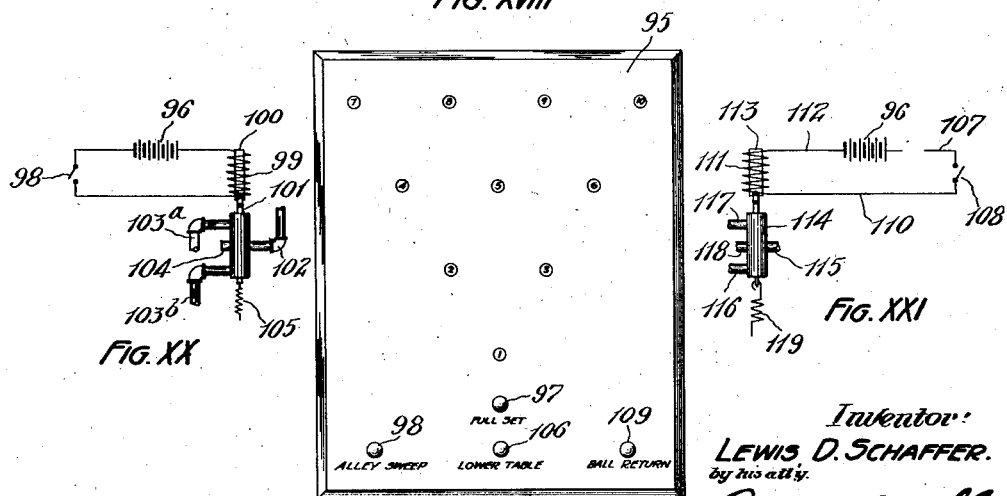

Patented May 3, 1927.

1,627,414

UNITED STATES PATENT OFFICE.

LEWIS D. SCHAFFER, OF CLEVELAND, OHIO, ASSIGNOR TO THE STATE BANKING & TRUST COMPANY, AS TRUSTEE FOR HIMSELF AND THE SINGER MANUFACTURING COMPANY, BOTH OF CLEVELAND, OHIO.

BOWLING-PIN-SETTING APPARATUS AND ITS METHOD OF OPERATING.

Application filed May 11, 1922. Serial No. 560,119.

My invention pertains to bowling apparatus and to the method of its operation.

The class of unskilled hands, often negro labor, upon which reliance has generally been of necessity placed for the removal of fallen pins, lifting of the balls to the return race-way, and resetting of the pins has proven extremely troublesome and unsatisfactory. I propose to provide means enabling each individual bowler to actuate mechanism for accomplishing the stated three classes of work between successive deliveries of a ball, and preferably employ the agent of electricity subject to the control of a series of buttons conveniently located at the end of the alley from which the bowling balls are to be delivered. The apparatus is capable of conducting any number of pins to a main hopper and after manual transference to smaller hoppers the pins may be mechanically released one at a time and caused to be set upright upon pre-arranged marks made upon the alley. My invention will eliminate the risk of liability for injury to pin boys resulting from their being struck either by the ball or by flying pins.

Specifically, I have mechanically combined elements of an apparatus, namely, a device for sweeping or raking pins, standing as well as fallen, both from the alley and from the gutters, into the pit; an arrangement for the separation in the pit of the pins from the ball; provision of elevators for receiving and lifting the pins and the ball respectively from the pit; arrangements enabling the pins to be spilled into an elevated main hopper and for the ball to be smoothly and quietly shoved out upon the return ball race, together with a pin setting contrivance including auxiliary hoppers adapted to be supplied with pins from the main hopper and a series of pin receiving cradles movable between the auxiliary hoppers and the alley for accurately depositing pins in an upright position in properly spaced relation upon the alley; besides provision of power means for actuating certain parts of the pin setting contrivance and a series of controls enabling any particular cradle to be supplied with one pin or any possible group of cradles each with one pin preparatory to effecting the set-up of such pin or group of pins, as the case may be.

Adverting to the drawings:

Figure I is a left side elevation of the major portion of the complete apparatus.

Figure II is an enlarged front elevation of the pin-setting contrivance and auxiliary hoppers, partly shown in section.

Figure III is a top plan view of Figure II, but several of the auxiliary hoppers being shown empty.

Figure IV is a correspondingly enlarged left side elevation of Figure II.

Figure V is a vertical cross section on line V—V of Figure III, showing in dotted lines a part of the pin-setting contrivance in an alternative position together with a series of pins deposited thereby upon the alley.

Figure VI is a plan section viewed on line VI—VI of Figure II.

Figure VII is a fragmentary elevation showing an intermediary position of those parts of the pin-setting contrivance which appear in dotted lines in Figure V at one limit of their movement.

Figure VIII is a vertical section on line VIII—VIII of Figure I looking rearwardly.

Figure IX is a vertical section on line IX—IX of Figure VIII with the inclusion of a ball in position preparatory to being lifted.

Figure X is a view corresponding to Figure IX showing one ball lifted and about to start its return toward the bowler, and also showing a ball stop in a different position in which it obstructs the movement of a ball into the path of its subsequent elevation.

Figure XI is a section on line XI—XI of Figure X looking downwardly. Figure XII is a detailed partial vertical section of one of the auxiliary pin hoppers showing in elevation the device for controlling the discharge of a pin from the auxiliary hopper and specifically showing the parts of the device in position to prevent the discharge of the lowermost pin in the hopper.

Figures XIII and XIV are views like Figure XII, the former showing the plunger and a trigger which are included as parts of the device both in a different position and the lowermost pin about to be released; and the latter figure showing the trigger but not the plunger in a different position preparatory to holding the next succeeding pin in the hopper.

Figures XV, XVI and XVII illustrate mechanism for sweeping pins from the alley and are respectively a side elevation in alternative position with certain parts in dotted lines, a front elevation and a plan view.

Figure XVIII illustrates an electrical wiring diagram for the pin control. Figure XIX is a plan view of the control board to be located at the end of the alley from which the balls are delivered. Figure XX is a diagrammatic view of a separate control and wiring diagram. Figure XXI is a view corresponding to Figure XX of another wiring diagram.

Pit arrangement.

In Figure I, I have designated the pin-setting end of the alley with the numeral 1, and shown a rear wall 2 between which is a pit having a bottom 3 sloping downwardly in two directions namely toward the rear and also to the right until it meets a right side wall 4 shown in Figure VIII. A suitable distance above the pit is a support 5 from the under side of which at 6 is pivotally suspended a frame 7 carrying in front a bumper pad 8. The latter is purposed to check the movement of the pins and the ball when hurled against it. It is allowed to swing backwardly in order to lessen the force of the impact. It will be observed in Figure I, that the lower edge of the pad 8 is so spaced from the bottom 3 of the pit as to enable pins P to slide rearwardly underneath it but to prevent the ball B doing likewise, the latter being therefore compelled to roll downwardly along the pad to the right until it is temporarily held in a certain position to be later explained when the ball elevating mechanism is described.

Ball elevating appliance.

Near the lower right corner of the bottom 3 of the pit (see Fig. X) a tube 9 is set in so that its top is below the level of the pit. Within the tube 9 is a spring 10 acting to force upwardly a stop rod 11 which projects through a laterally extending recess 12 adapted to permit an extension finger 13, which is carried by the upper end of the rod 11, to be depressed below the level of the pit bottom or to the position it is shown to occupy in Figure IX. Normally, the stop rod 11 projects above the pit bottom to hold the ball B out of the corner of the pit as is clearly illustrated in Figure X, before the elevator for raising the ball reaches its lowermost position preparatory to receiving the ball and lifting it to its return race as will now be described. Guided in a suitable tube 14 is a piston operated rod 15 adapted to be moved up and down in time relation to the actuation of other mechanism. The description of the manner of accomplishing up and down movement of the rod 15 will be deferred. The lower end of the rod 15 carries a U shaped member 16 terminating as a ring 17 adapted to intersect the recess 12 as shown in Figure IX. When the ring 17 is approaching such position it will engage the finger 13 to move it together with the rod 11 downwardly as shown, thereby permitting the ball B to roll over it and onto the ring. The end of the inclined ball return race 18 is curved at 19 to join with a depending substantially perpendicular extension 20 of the race purposed to serve as a lateral guide along a portion of which the ball is to roll during its upward movement. It being desirable to have the ball placed as gently and quietly as possible upon the race 18, I have provided means to this end consisting of a pair of brackets 21 secured to the wall 2 above and below the top of the race 18 which brackets carry a track having a lower end 22 upwardly inclined from the wall 2 toward the lateral guide 20, a middle section 23 extending substantially parallel with the guide 20 and a distance therefrom slightly exceeding the diameter of the largest ball used, and an upper end 24 curved forwardly to conform to the corner 19. By this arrangement the ball B during its ascending movement will presently engage the guiding track 22 and be rolled forwardly between the walls of the lateral guide 20. Thereafter it passes along the section 23 and when it commences to engage with the upper section 24 is gradually shoved over against the corner 19 and smoothly rolled out upon the race 18 along which it will roll on its return toward the bowler awaiting it.

Pin elevating and dumping contrivance.

Directing attention to Figures I and VIII, it will be seen in the first figure that the lower rear end of the pit bottom 3 is provided entirely across from side to side with a depression 25 adapted to be occupied by the sloping bottom of a pin elevator 26 so as to provide substantially flush surfaces over which the pins will slide into the elevator 26. On each side of the pin elevator I provide a pair of pipes 27 extending upwardly to a point at the top of the apparatus where they are curved forwardly at 28 to a position above a main hopper 29 the construction clearly shown in Figure I of the drawings. Each side of the pin elevator 26 carries a pair of opposed concave rollers 30 adapted to engage and roll against the front and rear sides of the pipes 27 when the elevator 26 is raised or lowered by means of two cables 31 which pass around a pair of sheaves 32 appropriately spaced upon a shaft 33. The manner of effecting the winding and unwinding of the cables 31 will hereinafter appear. As should now be understood, especially with the aid of the dotted position of the elevator 26 when the dumping of the pins into the main hopper 29 occurs the rollers 30 will follow the curvature of the upper ends 28 of the pipes thereby causing the elevator 26 to be tipped to the discharging position shown in Figure I.

*Frame and auxiliary hoppers.*

Erected partly over the end 1 of the alley partly over the pit 3 is a rectangular frame 34 including near its middle forwardly converging supports 35 clamped together and held in place by brackets 36. Carried within the support 35 are a series of ten auxiliary hoppers 37 having flared entries 38 to which pins are to be manually supplied in substantially equal numbers from the main hopper 29. The auxiliary hoppers 37 are disposed according to the conventional pin set-up for the ten pin game, and are intended each to contain a plurality of superimposed pins lying on their sides. Inasmuch as the construction of all auxiliary hoppers is the same the description of one will suffice and accordingly the singular number will be used. The lower discharge end of each hopper is shaped to conform to the curvature of the pin as appears in Figure V and is also downwardly inclined in a sidewise direction as a chute 39 as appears in Figures XII, XIII and XIV to which attention should now be given. Pivoted at 40 across an aperture 41 formed in a bracket 42 is a bowling pin stop 43 normally held against the side of the lowermost bowling pin in the hopper in consequence of the action of a counterweight 44. The pressure of the bowling pin would rock the stop 43 as appears in Figure XIII notwithstanding the counterweight but for the alternative interpositioning of a device controlled by a solenoid 45 actuating an armature 46 carrying a plunger 47 movable through a guide 48 and adapted normally to fall behind the upper end of the stop member as shown in Figure XII whereby to lock it against movement by the lowermost pin or to be lifted to the position shown in Figure XIV when an electric circuit of which the solenoid 45 forms a part is energized. When one pin has been discharged to an appropriate cradle yet to be described, the discharged pin will itself act to prevent exit of the next pin until the plunger 47 again locks the stop 43.

*Lowering table mechanism.*

Carried upon the top of the frame 34 at opposite sides thereof are a pair of brackets 49 across which is mounted a shaft 50 carrying three drums 51 to which are secured a middle cable 52 and two side cables 53 to be wound and unwound therearound. The cable 52 passes over a sheave 54 supported on the front upper corner of the frame and continuing downwardly to a point below the bottom of the hoppers 37 is there attached at 55 to a lowering table 56. Secured to opposite sides of the table 56 as appears in Figure VI are brackets 57 upon which are carried a pair of rods to the upper ends of which the lower ends of cables 53 are fastened. Mounted on brackets secured to the frame 34 are a pair of pipes 58 through which the cables 53 pass as may be seen in several of the figures. The construction of the lowering table is best shown in Figures V, VI and VII. A set of ten cradles 59 are each hinged at one end at 60 to the upper surface of the table 56 and are so arranged as to receive pins to be ejected from the hoppers 37. It will be observed that it is the forward end of each cradle which is pivoted. Just ahead of each cradle the table 56 is provided with a circular opening 61 large enough to permit a bowling pin to slip lengthwise therethrough, and the forward edge of each of the openings 61 is bordered by an upwardly and downwardly projecting arcuate flange 62 clearly shown in Figure V. After a cradle 59 has received a segregated pin from a hopper, it is adapted to discharge the pin through the opening 61 by a tilting action indicated in dotted lines in Figure V so as to deposit the bowling pin in an upright position upon its particular spot on the alley. The purpose of the flanges 62 is to check the sliding movement of the pins and to cause them to pass through the openings 61. I provide duplex means for accomplishing the tilting of the cradles, and connect their free ends together by means of links 63 so that their tilting action may be simultaneously accomplished during the downward or setting movement of the table 56 to be effected by mechanism to be now described. Attached to that particular hopper 37 from which the center pins are supplied are a pair of brackets 64, shown in Figures III and V, which are purposed to support a cylinder 65 to which compressed air is to be supplied through a pipe 66 whereby to impart an up and down movement to a piston 67 to which is attached a rod 68 connected with the table 56. Disposed underneath three cradles, at the corners of a substantially equilateral triangle, the table 56 is fashioned with three holes 69 through which extend pushrods 70 provided with collars 71 and 72 on opposite sides of each hole 69 whereby to limit the movement of the rods 70 in either direction. As will be readily understood, when the table descends the lower end of each rod 70 engages the alley and in moving upwardly tilts the cradle above and through the agency of the links 63 as shown in Figure V. The collars 72 on the three rods 70 serve to limit the downward movement of the table. The other cradle tilting contrivance likewise consists of three rods 73 which impart a lifting action. They are attached at 74 (see Figures V and VI) at three nearly equi-spaced points to the free ends of three cradles, passed upwardly through three guides 75 carried by the hopper casings 37 and terminate at the top as hooks 76. After the table 56 has reached a certain stage of its descending movement the hooks 76 will engage the guides 75 so that the latter act as a stop against further downward movement on the part of the rods 73, in consequence of which the cradles are tilted. The action of the lift rods 73 is so timed that they will commence to lift the cradles just before the push rods 70 engage the alley, so that while the auxiliary action of the latter is available their engagement with the alley is lighter and hence less likely to mar the surface of the same.

Also mounted on the shaft 50 is a sprocket wheel 77 connected by means of a sprocket chain 78 with a smaller sprocket wheel 79 on another shaft (not shown) carried at the top of the frame. The movement of the sprocket wheel 79 is communicated to a drum 80 separately mounted therewith to which the ends of the cable 31 are attached and upon which they are to be alternately wound and unwound. The power transmission is such that the movement of the lowering table 56 multiplies the movement of the pin hopper 26. It is to be understood that the movement of the lower table 56 is positive in both directions and that during its descending movement the cables 52 and 53 unwind to rotate the drums 51 and 80 and elevate the pin hopper 26 whereas during the ascending movement of the table the weight of the hopper 26 will be sufficient to rotate the drums 80 and 51 in the opposite direction and thereby rewind the cables 52 and 53.

Alley sweeper.

The description of that part of my apparatus which is purposed to sweep both standing and fallen pins from the alley into the pit is mainly illustrated in Figures XV to XVII. Erected at either side of the alley some distance ahead of the pin spots thereon are a pair of standards 81 in which are movably mounted rods 82 each of which is connected with a collar 83 through which an air cylinder 84 may be adjusted to be secured by a set screw 84ª. Connected with opposite ends of the cylinder 84 are pipes 85 leading to a valve chamber 86 as shown in Figure XVII. A plunger carrying on its outer end a bar 87ª is operatively associated with the cylinder 84. The bar 87ª is secured to a pair of rods 88 movable through holes 89ª in an oscillatory bar 89 mounted in brackets 90 carried on the front of the frame. The end of the rods 88 carry nuts 91 to prevent withdrawal thereof out of the openings 89. Coiled about each of the rods 88 is a spring 92 normally acting to move the nuts 91 toward the openings 89. The rods 88 extend beyond the bar 87ª in the opposite direction and carry between them a roller 93 and two disks 94, the latter being adapted to come into engagement with and roll along the troughs of the alley while the roller 93 moves along just above the surface of the alley as indicated in dotted lines in Figure XV. It is to be understood that the plunger 87 is positively actuated in both directions in a manner to be hereinafter described. The dotted positions of the sweeper illustrated in Figure XV show it in its middle and one extreme position whereas its position of rest is shown in full lines and as appears in Figure XVI leaves plenty of clearance.

Electrical controls.

The wiring diagrams and electrical controls for the compressed air connections are illustrated on the last sheet. Inasmuch as the control of the compressed air is the same for distinct mechanisms only two, the diagram for the alley sweeper and for the ball return have been illustrated. A control board 95 is provided with ten push buttons numbered and arranged to correspond with the pin-setting spots on the alley. It also includes a "full set" button, and "alley sweep" button, a "ball return" button and a "lower table" button. Each of the buttons is in fact a switch for closing a particular electric circuit including in each instance a battery or other source of current and a solenoid. The diagram shown in Figure XVIII is almost self-explanatory, one battery 96 serving the whole system and each separate circuit being provided with its own magnet and switch numbered according to the particular bowling pin. The "full set" button controls a ring 97 which by simultaneously contacting with ten points is enabled to close all circuits and therefore set all of the pins. Directing particular attention to Figure XX, the alley sweep control diagram, which could be duplicated for the lowering table, it will be observed that the closing of a switch 98 when operated by the alley sweep button energizes a solenoid 99 adapted to draw up an armature 100, controlling a valve 101 so as to permit compressed air to flow from a pipe 102 to a pipe 103ª leading to the head end of the cylinder 84 so as to sweep the pins from the alley. The parts in the valve are so arranged that, in this position, the air from the tail end of cylinder will pass through pipe 103ᵇ from the cylinder and exhaust through pipe 104. When the switch 98 is released or the circuit broken the parts of the valve 101 assume a position such that the compressed air flows through the pipe 103$^b$ to the tail end of the cylinder and the air in head end exhausts through the pipe 104. A return spring 105 effects the performance just stated. If it is desired to actuate the lowering table instead of the alley sweep the button 106 is available.

The diagram shown in Figure XXI shows a wire 107 leading from the battery 96 to a switch 108 controlled by the ball return button 109, which when closed permits the current to flow along a wire 110 to the electro-magnet 111 and back to the battery along the wire 112. When the circuit is closed the upper movement of an armature 113 so shifts the valve in a chamber 114 as to permit compressed air from a supply pipe 115 to lead to the lower or head end of the cylinder 14 through pipe 117, the upper or head end exhausting through opening 118 via pipe 116. To accomplish the return of the ball lift the compressed air exhausts from the lower end of cylinder 14 through the pipe 117 and is allowed to flow through the pipe 118. A return spring 119 accomplishes the release of the air in the cylinder.

*Operation.*

Assuming the ten auxiliary hoppers 37 each to be filled with pins, a bowler desiring to commence a game first presses the "full set" button to supply each of the ten cradles 59 with a pin, the pressure upon such button acting to bring the ring 97 into contact with the ten contacts shown in Figure XVIII so as simultaneously to close the ten circuits and to lift the ten plungers 47 thus permitting the lowermost pin in each of the ten hoppers to raise the counterweight 44 as shown in Figure XIII to fall into its cradle 59 as shown in Figure XIV. Upon the release of the "full set" button the plungers again fall, to the position as the one shown in Figure XII, in time to lock the stop 43 before the support furnished by the pin in the cradle is removed from the pin next above. After the ten cradles have been filled in this manner the bowler presses button 106 to close a circuit and permit compressed air to flow to the head end of the cylinder 65 thereby downwardly moving the rod 68 and the lowering table 56 along with it. When the table reaches the limit of its downward movement as shown in Figure V each cradle will have been tilted sufficiently to cause the pin in it to slip down past the flange 62 and through the opening 61 to gravitationally assume its upright position upon its appropriate spot as marked upon the alley. Thereafter a spring shifts the position of the air valve to permit the compressed air to reach the tail end of the cylinder thus again raising the table 56 to its position directly underneath the hoppers.

As the table 56 moves downwardly it unwinds the cable 52 and 53 to rotate a sprocket 77 and hence the sprocket 79 thereby winding the cable 31 upon the drum 80. It will be observed, upon inspection of the upper end of Figure I, that the movement of the cables 52 and 53 is multiplied as it is transmitted to the cable 31 and to such an extent that the comparatively short downward movement of the table 56 causes the pin hopper 26 to be elevated a much greater distance and in fact between the limits of movement of its full and dotted positions illustrated in Figure I. In the mean time the "ball return" button 109 could also be pressed to close the circuit diagrammatically shown in Figure XXI whereby to permit compressed air to flow through the pipe 117 also shown in Figure VIII to raise the rod 15, the ball carrying ring 17 and any ball that may have found its way thereon. The manner in which a ball when lifted is moved out upon the return race 18 has already been described and is clearly shown in Figures IX, X and XI.

When a ball has hurled some of the pins into the pit 3 and itself fallen into the same as shown in Figure I, the pins will slide or roll underneath the bumper 8 on to the hopper 26 at the lower rear end of the pit, but the ball movement is momentarily arrested by the bumper 8 along which it then moves sideways down the lateral declination toward the stop 11. If a certain number of pins have been left standing without any fallen pins on the alley the bowler may proceed to roll his second ball. If, on the other hand, one or more pins are lying as well as standing upon the alley, the bowler will first make mental note of the arbitrarily numbered position of the standing pins and then press the alley sweep button 98 to set in operation the parts diagrammatically shown in Figure XX and cause the roller 93 to sweep off into the pit both standing and fallen pins. Thereafter the bowler will selectively press those distinct pin set-up buttons corresponding with the numbered positions of the pins which he remembers to have been left standing. Apparently, the four pins shown standing in Figure I might be construed to be pins 1, 2, 4 and 7. That being so, the bowler would either simultaneously or successively press the buttons numbered 1, 2, 4 and 7 on the control board shown in Figure XIX thereby supplying the four correspondingly located cradles each with a pin preparatory to moving the four segregated pins by means of the lowering table 56 to a set-up position upon the alley.

I claim:—

1. A bowling apparatus comprising a device for removing pins, compressed air operated means for actuating said device and an electrical agency for controlling the operation of said means.

2. A bowling apparatus comprising the combination with an alley of an expansible and contractible device movable along said alley to rake pins therefrom, a spring tending to cause parts of said device to assume one of their alternative positions, and mechanism including a plunger for positively effecting the bodily actuation of said device.

3. A bowling apparatus comprising a pin sweeper adapted to be projected over the pin-setting end of an alley, an air cylinder, a plunger in the latter operatively connected with said sweeper, a source of compressed air, and a valve for controlling the supply of compressed air to said cylinder to actuate said plunger in either of two directions.

4. A bowling apparatus comprising the combination with an alley, of a hopper adapted to be moved up and down at the end of said alley and to be upset at the upper end of its travel, an elevated hopper into which said first mentioned hopper is designed to discharge, and means for actuating the latter.

5. A bowling apparatus comprising a pit provided with a bottom sloping down both in a rearward and in a sidewise direction together with a yieldingly suspended bumper so spaced from said bottom as to permit the passage therebelow of a pin while deflecting a ball laterally.

6. A bowling apparatus comprising the combination of a pit provided with a bottom of substantially the same width as the alley and sloping downwardly toward the rear and toward one side, a member of substantially the same width as the alley, said member being hung and adapted to swing over said bottom so as to prevent the passage of a ball, but not a pin, a pin hopper behind said member and a ball hopper on the side of said member toward which said bottom slopes downwardly.

7. A bowling apparatus comprising the combination with an alley pit, of a hoisting hopper adapted to receive objects hurled into said pit, a pin-setting contrivance, and mechanism for simultaneously actuating said hopper and contrivance at irregularly synchronized time intervals.

8. A bowling apparatus comprising the combination with an alley pit, of a hoisting hopper adapted to receive objects hurled into said pit, a pin-setting contrivance, and mechanism so connecting said hopper and contrivance that one is raised when the other is lowered and means for actuating said mechanism.

9. A bowling apparatus comprising the combination with an alley pit, of hoisting pin and ball hoppers adapted to receive a pin and a ball respectively hurled into said pit, a pin-setting contrivance, and mechanism so connecting said hoppers and contrivance that the former are raised when the latter is lowered and means for actuating said mechanism.

10. In a bowling apparatus the combination with an alley pit having a bottom sloping downwardly in transverse directions, of a ball carrier and a hanging bumper arranged to yield and check the movement of a ball down one slope of said bottom whereupon said ball continues down the other slope to said carrier.

11. In a bowling apparatus the combination with an alley pit having an unbroken bottom surface sloping downwardly both to the rear and sidewise of a bumper pivotally mounted over said pit and extending crosswise of said alley, and an elevating ball carrier at one lateral end of said bumper adapted to receive a ball turned aside by the latter.

12. Bowling apparatus comprising the combination with an alley pit, a ball race for returning a ball toward the delivery end of the alley, and means including a pivotally hung bumper cooperating with the configuration of said pit together with an intermittently actuated elevator for conducting a ball therefrom to said race.

13. Bowling apparatus comprising the combination with an alley pit having a laterally sloping bottom, a ball race for returning a ball toward the delivery end of the alley, a bumper pivotally hung in spaced relation above said bottom and adapted to turn a ball down said slope, mechanism for lifting a ball to said race, and means intermittently operating said mechanism.

14. Bowling apparatus comprising a ball lift, an alley pit having a bottom sloping toward said lift, and a yieldingly hung bumper arranged ahead of said lift and adapted to turn aside a ball impinging against it so as to compel its rolling in a changed direction toward said lift.

15. Bowling apparatus comprising a ball lift, an alley pit having a bottom down-sloping both backwardly and laterally, a swingable bumper arranged to turn aside a ball impinging against it so as to compel its rolling toward said lift, a pin setting contrivance, and means for simultaneously actuating said lift and contrivance, one through its functioning operation while the other performs an idle operation.

16. Bowling apparatus comprising an alley pit fashioned with a sloping bottom, a movable ball carrier adapted to receive a ball rolling across said pit and a stop at the pit bottom and separate from said carrier and normally obstructing the passage of a ball occupying said pit while moving toward the path of movement of said lift.

17. Bowling apparatus comprising an alley pit fashioned with a sloping bottom, a support adjacent to said pit, a ball elevator movably mounted on said support and adapted when in its lowered position to receive a ball rolling across said pit and a stop at the upper surface of said bottom and normally obstructing the movement of a ball while in said pit to prevent it reaching the path of movement of said elevator, said stop adapted to be moved to its unobstructing position when said elevator is in place to receive the ball.

18. Bowling apparatus comprising an alley pit fashioned with a sloping bottom, an upright guide structure alongside of said pit, a ball elevator mounted for movement on said structure and adapted when in its lowered position to receive a ball rolling across said pit, a stop at the level of the pit bottom and normally obstructing the passage of a ball therealong into the path of movement of said elevator, said stop adapted to be engaged by said elevator during its descending movement and moved to its unobstructing position to permit the ball to rest upon said elevator, and means for operating said elevator.

19. Bowling apparatus comprising the combination with an alley pit, a ball return race elevated with respect to said pit and provided with a guide extending downwardly from it, a bent track opposed to said guide and mechanism for conveying a ball from said pit between said guide and track, the conformation of said track serving to move the ball against said guide and to shove it upon said race.

20. Bowling apparatus comprising the combination of an alley pit, a ball return race elevated with respect to said pit and provided with a guide extending downwardly from it, an elevating structure adapted to receive a ball from said pit and raise it toward said race, and a member having a surface adapted to be engaged by the ball during its ascending movement and to press the ball against said guide.

21. Bowling apparatus comprising a multiple pin receiving hopper adapted to contain superimposed pins in reclining position, and means including a control device adapted to engage the side of a pin for discharging pins therefrom one at a time.

22. Bowling apparatus comprising multiple pin receiving hoppers adapted for mounting over a bowling alley, and individually operable devices for selectively controlling the discharge of one pin at a time from any chosen number of said hoppers.

23. Bowling apparatus comprising a pin receiving hopper, a trigger normally obstructing the emergence of a pin from said hopper, and electro-magnetic means for releasing said trigger.

24. Bowling apparatus comprising a multiple pin receiving hopper, a trigger arranged normally to resist the discharge of a pin from said hopper, electrical means including an armature adapted when in its released position positively to hold said trigger in its obstructing position, and magnetic means for withdrawing said armature from its holding position.

25. Bowling apparatus comprising a hopper adapted to contain pins in superimposed relation, a trigger arranged normally to resist the discharge of the lowest pin in said hopper, electrical means including an armature adapted when in its gravitationally extended position positively to hold said trigger in its obstructing position, and magnetic means for momentarily withdrawing said armature from its holding position whereby to release pins singly from said hopper.

26. Bowling apparatus comprising a series of pin hoppers each adapted to contain a plurality of superimposed pins, a table provided with openings, cradles pivotally mounted adjacent to said openings and adapted to receive pins from said hoppers respectively, and means for actuating said table to discharge pins from said cradles through said openings.

27. Bowling apparatus comprising the combination with an alley, of a series of elevated pin hoppers each adapted to contain a plurality of pins, a pin-setting table movable between said hoppers and alley and adapted to receive pins singly from said hoppers, selectively operable devices for releasing one pin at a time from said hoppers respectively to said table and means for actuating the latter.

28. Bowling apparatus comprising the combination with an alley, of a series of pin hoppers, a pin-setting table movable between said hoppers and alley, distinct means for selectively discharging a pin from any desired number of said hoppers upon said table, and means for actuating said table to release and set pins upright upon said alley.

29. Bowling apparatus comprising the combination with an alley, of a pin hopper adapted to contain a plurality of pins, a pin-setting table movable between said hopper and alley, a cradle carried by said table, means for discharging a pin from said hopper into said cradle, and means for actuating said table and adapted automatically to tip said cradle and release a pin so as to deposit it in an upright position upon said alley.

30. Bowling apparatus comprising the combination with an alley, of a series of pin hoppers adapted to contain a plurality of pins, a pin-setting table movable between said hoppers and alley, cradles carried by said table, means for discharging a pin from each of said hoppers into said cradles respectively, and means for lowering said table and automatically operating means for tipping said cradles during the descending movement to release pins and deposit them in an upright position upon said alley.

31. Bowling apparatus comprising the combination with an alley, of a series of multiple pin hoppers elevated above said alley, a pin-setting structure movable between said hoppers and alley and including a series of cradles corresponding in number to the number of hoppers and adapted to receive each one pin, means for releasing pins one at a time from said hoppers and means for actuating said structure and for tilting said cradles when they reach a predetermined stage of their movement toward said alley.

32. Bowling apparatus comprising the combination with an alley, of a series of pin hoppers elevated above said alley, a pin-setting structure movable between said hoppers and alley and including a series of cradles corresponding in number to the number of hoppers and adapted to receive each one pin, distinct means for independently releasing pins from said hoppers and mechanism for actuating said structure and for tilting said cradles when they reach a predetermined stage of their movement toward said alley whereby to set upon said alley the pin or pins which may have been released from hopper to cradle.

33. Bowling apparatus comprising the combination with an alley, of a pin hopper elevated above said alley, a pin-setting structure movable up and down between said hopper and alley and including a single pin supporting device, means for actuating said structure, and means for releasing a pin from said hopper and operable independently of the means for actuating said structure, said device being automatically actuated when it reaches a predetermined stage of its descending movement in unison with said structure so as to release and set upon said alley a pin which was released from hopper to cradle.

34. The hereindescribed method which consists in arranging pins in predetermined spaced relation with respect to the set-up end of a bowling alley, selectively segregating any required number of pins from said arrangement of pins, holding them in a position nearer to the alley and then bringing the selected pin or pins to set-up position at the set-up end of the alley.

35. The hereindescribed method which consists in elevating pins, arranging a full set of pins into predetermined spaced relation above the set-up end of a bowling alley, selectively segregating and separately holding less than a full set of pins in a position nearer to the alley and then actuating the pins so segregated to standing position upon the alley.

36. In apparatus of the character described, the combination of a support, a pin hopper, and a cradle adapted to receive a pin from said hopper and mounted on said support so as to be adapted both for bodily and for tilting movement.

37. In apparatus of the character described, the combination of pin holding hoppers, a carrier table movable toward and away from said hoppers, cradles mounted thereon for movement relative to said table, and selectively operable devices cooperating with the discharge end of said hoppers respectively and each adapted independently to control the emergence of a pin from one of said hoppers.

38. In apparatus of the character described, the combination of a support, hoppers, cradles movably mounted on said support for receiving pins from said hoppers respectively and devices operable independently of each other corresponding in number to said hoppers for controlling the discharge of pins therefrom.

39. In apparatus of the character described, the combination of hoppers corresponding in number to a full set of pins, a carrier table movable toward and away from said hoppers, cradles corresponding in number to said hoppers and movably mounted on said table for receiving pins from said hoppers respectively, devices for controlling the discharge of a single pin from said hoppers respectively, and selective means for operating a varying number of said devices as determined by the particular pin set-up desired.

40. Bowling apparatus comprising an alley pit fashioned with a sloping bottom, a movable ball carrier adapted to receive a ball rolling across said pit and a stop movably connected at said pit bottom adapted for movement independently of said carrier and normally obstructing the passage of a ball while rolling on said bottom toward the path of movement of said lift.

41. Bowling apparatus comprising the combination of an alley pit, a support adjacent thereto, a ball return race elevated with respect to said pit and provided with a depending guide extending downwardly from it, a guide track carried by said support in opposition to said depending guide and mechanism for lifting a ball from said pit, between said distinct guides whereby it becomes shoved upon said race.

42. Bowling apparatus comprising the combination of an alley pit, a ball return race elevated with respect to said pit and provided with an upright guide extending downwardly from it, an elevating structure adapted to receive a ball from said pit and raise it toward said race, and a fixed member having a surface oblique with reference to said guide and adapted to be engaged by the ball during its ascending movement and to first press the ball against said guide and then force it out onto said race.

43. Bowling apparatus comprising a plurality of pin receiving hoppers mounted over a bowling alley, and means for selectively discharging one pin at a time from any chosen number of said hoppers.

44. Bowling apparatus for use at a bowling alley comprising a pin receiving hopper above said alley, a trigger normally obstructing the emergence of a pin from said hopper, and electro-magnetic means for releasing said trigger.

45. Bowling apparatus comprising a series of pin hoppers each adapted to contain a plurality of superimposed pins, a table adapted to receive pins from said hoppers, and plural selectively operable means for releasing different numbers of pins to said table.

46. Bowling apparatus comprising the combination with an alley, of a series of elevated pin hoppers each adapted to contain a plurality of pins, a table between said hoppers and alley and provided with openings, cradles carried by said table and adapted to receive pins singly from said hoppers, and multiple selectively operable means for releasing a pin from a varying number of said hoppers to said cradles and means for releasing pins from cradles which they occupy.

47. Bowling apparatus comprising the combination with an alley, of pin hoppers each adapted to contain a plurality of pins, a pin-setting table movable between said hoppers and alley, cradles carried by said table, distinct separately operable means for discharging a pin from each of said hoppers into a cradle, and means for actuating said table and adapted automatically to tip said cradles and release pins so as to deposit them in an upright position upon said alley.

48. Bowling apparatus comprising the combination with an alley, of a series of pin hoppers adapted to contain a plurality of pins, a pin-setting table movable between said hoppers and alley, cradles carried by said table, distinct separately operable means for discharging a pin from each of said hoppers into said cradles respectively, means for selectively controlling said distinct means, mechanism for lowering said table and automatically operating means for tipping said cradles during the descending movement to release pins and deposit them in an upright position upon said alley.

49. Bowling apparatus comprising the combination with an alley, of a plurality of pin hoppers elevated above said alley, a pin-setting structure movable up and down between said hoppers and alley and including a plurality of single-pin supporting devices, distinct selectively operable means for releasing a pin from a varying number of said hoppers and mechanism for actuating said structure and for so actuating said devices when they reach a predetermined stage of their descending movement as to release and set upon said alley pins which were released from said hoppers to said devices.

50. Bowling apparatus comprising the combination with an alley pit and a relatively elevated ball return race, of a pair of fixtures one of which has a section converging toward the other near a ball receiving point of said race, and mechanism for conveying a ball between said fixtures.

51. Bowling apparatus comprising the combination with an alley pit and a relatively elevated ball return race, of a pair of spaced fixtures, one of said fixtures extending to the upper end of said race, the other fixture having an upper end somewhat higher than and bent toward said race, and means for raising a ball between said fixtures.

52. Bowling apparatus for use at a bowling alley comprising a pin receiving hopper, a device normally obstructing the emergence of a pin from said hopper and electrical means for controlling the position of said device.

53. Bowling apparatus for use at a bowling alley comprising a hopper, a movable table, a cradle having one end pivoted on said table, means for controlling the delivery of a pin from said hopper to said cradle and means for tipping said cradle to set a pin upon the alley.

54. Bowling apparatus comprising a pin hopper adapted to contain a plurality of pins, a table adapted to receive pins from said hopper, means for actuating said table toward the alley, and means including a member adapted to impinge against the alley for releasing a pin from said table.

55. Bowling apparatus comprising pin hoppers each adapted to contain a plurality of pins, a movable table, cradles carried by said table and adapted to receive pins from said hoppers respectively, selectively operable devices each adapted to control the transfer of a pin from one of said hoppers, means for moving said table and means for dscharging pins from said cradles.

56. Bowling apparatus comprising a series of pin hoppers each adapted to contain a plurality of pins, a table, cradles corresponding in number to said hoppers and carried by said table and each adapted to receive one pin from one of said hoppers, and selective means for discharging a pin to one or more of said cradles.

57. Bowling apparatus comprising the combination with an alley, of a series of pin hoppers each adapted to contain a plurality of pins, a table movable between said hoppers and alley, cradles movably carried by said table and adapted to receive pins singly from said hoppers, selective means for discharging pins from said hoppers to said cradles, means for moving said table and means for releasing pins from said cradles onto said alley.

58. Bowling apparatus comprising the combination with an alley, of a series of pin hoppers, a pin-setting table movable between said hoppers and alley, a cradle carried by said table under each of said hoppers, distinct selectively operable means for discharging a pin from a varying number of said hoppers into their respective cradles, and means for actuating said table whereby automatically to release pins from said loaded cradles and set them upright upon said alley.

59. The hereindescribed method which consists in collecting a full set of pins, arranging a full set in predetermined spaced relation with respect to the set-up end of a bowling alley, selectively releasing and then actuating a variable lesser number of pins from said full-set grouping into position for the bowler.

60. The hereindescribed method which consists in causing bowling pins to be appropriately collected at the set-up end of a bowling alley having a plurality of predetermined pin depositing spots, selectively segregating any desired number of pins and gravitationally holding them in position for proper delivery to the set-up end of the bowling alley, and depositing said chosen number of pins upon their respective pin spots on the alley.

61. Bowling apparatus for use at a bowling alley comprising pin receiving hoppers, devices normally obstructing the emergence of a pin from said hoppers respectively, selective means for controlling the position of any number of said devices independently of each other and mechanism for setting upon the alley the pins which were permitted to emerge.

62. In a bowling alley comprising a pin hopper adapted to contain a plurality of pins, a pin-setting device having holders for individual pins, selective means for discharging pins from said hopper to said holders, and means for actuating said pin holders and for placing pins carried thereby into desired erect position at the set-up end of the alley.

63. In a bowling alley, mechanism for holding a complete set of pins in predetermined spaced relation at the set-up end of the alley, pin-setting mechanism, selective mechanism for simultaneously releasing varying numbers of pins from said holding mechanism to said pin setting mechanism and power means for actuating said mechanisms.

64. In a bowling alley, mechanism including devices for holding pins in an appropriate position for delivery to the set-up end of the alley, selective by operable control devices cooperating with said holding devices for releasing varying numbers of pins and mechanism for receiving and transferring said released pins into set-up position with respect to said alley.

65. In a bowling alley, mechanism for conveying fallen pins to an appropriate position for delivery to the set-up end of the alley, mechanism for arranging pins in predetermined spaced relation at the set-up end of the alley, mechanism for selectively discharging one or more pins from said arranging mechanism and mechanism for receiving said discharged pins and delivering them to the alley.

66. In a bowling alley, means for holding a full set of pins according to the arrangement of pin spots on the alley, mechanism for receiving and delivering pins at the set-up end of the alley and selective mechanism for releasing from said held pin supply from said conveyed pin supply to said delivery mechanism any number of pins less than a full set.

67. In a pin-setting apparatus for bowling alleys, in combination, supports for holding pins, a movable appliance for receiving pins from said supports, selective means for supplying varying numbers of pins in desired position to said appliance and means for actuating the latter whereby the selected pins are delivered in set-up position.

68. In a pin-setting apparatus for bowling alleys, in combination, a support for holding pins above the alley, a carrier movable between said support and alley, selective means for releasing varying numbers of pins in desired arrangement to said carrier and means for actuating said carrier whereby the selected pins are delivered in set-up position.

69. In a pin-setting apparatus for bowling alleys, in combination, mechanism for delivering pins to a predetermined number of locations, a movable structure for receiving pins from said mechanism and adapted to place them in set-up position and selective means for controlling the transfer of pins from only some of said locations to said structure.

70. In a pin-setting apparatus for bowling alleys, in combination, hoppers for holding pins in predetermined arrangement, a movable pin-setting structure for receiving pins from said hoppers preparatory to delivery to the alley and selective means for controlling the order of transfer of pins from said hoppers to said structure.

71. In a bowling alley, mechanism for supporting a full set of pins in predetermined spaced relation near and preparatory to placing them in position at the set-up end of the alley and selective mechanism for directly depositing less than the full set of said supported pins upon predetermined spots of said alley.

72. In a bowling alley, mechanism for receiving and distributing pins, mechanism for positioning pins into set-up position with respect to said alley and selective mechanism for controlling the number of pins adapted to pass from said distributing mechanism to said positioning mechanism.

73. In a bowling alley, mechanism for receiving and distributing pins, mechanism for selecting one or more pins from said distributing mechanism and mechanism for receiving and positioning the selected pins into set-up position with respect to said alley.

74. In a bowling alley, mechanism for receiving, distributing and holding pins in predetermined arrangement above the set-up end of the alley, and mechanism for selectively releasing and depositing one or more pins upon said alley.

75. In a bowling alley, a distributing hopper for receiving and holding pins in predetermined spaced relation with respect to the set-up end of the alley, mechanism for selectively separating varying numbers of pins and mechanism for directly positioning the selected pin or pins in standing position for the bowler.

76. Bowling apparatus comprising the combination with an alley, of mechanism for placing pins in set-up position and including a plurality of pin supporting devices in predetermined arrangement, said devices being movable toward and away from said alley and selectively operable devices for controlling the delivery of pins to said devices.

77. Bowling apparatus comprising the combination with an alley, of mechanism for placing pins in set-up position and including a plurality of single-pin supporting devices in predetermined arrangement and adapted to support pins in reclined position, said devices being movable toward and away from said alley, individually operable means for controlling the delivery of one pin at a time to each of said devices and means for bringing said pins to erect position during their progress toward the surface of said alley.

78. In a bowling alley the combination of mechanism for receiving pins and for placing them in position, said mechanism including a plurality of single-pin supports in predetermined arrangement together with independently operable devices for selectively controlling the delivery of pins to said supports, said supports being movable toward and away from said alley and means for operating said mechanisms.

79. In a bowling alley, mechanism for selectively bringing and gravitationally supporting any desired number of pins into predetermined spaced relation with respect to the set-up end of the alley, and means for moving the pin-supporting part of said mechanism and adapted directly to place the chosen pin or pins into standing position as required by the bowler.

80. In combination with a bowling alley having a plurality of indicated spots where pins are to be set up, mechanism for collecting and a contrivance for distributing fallen pins in predetermined spaced relation corresponding to the arrangement of said spots, mechanism for holding said pins in position for delivery, mechanism for positioning a pin upon one, or several pins on as many, of said spots and mechanism for selectively controlling the transfer of a pin or pins desired from said holding mechanism to said positioning mechanism.

81. In a bowling alley, mechanisms for collecting and for holding fallen pins in predetermined spaced relation above the set-up end of the bowling alley, and mechanism for segregating one or more pins and directly depositing the selected number of pins upon the alley.

82. The cycle in operating a bowling game which consists in holding bowling pins in predetermined spaced relation with respect to the set-up end of the alley, segregating any desired number and arrangement of said pins and directly placing the segregated pins in proper position for a bowled ball.

83. Bowling apparatus comprising a pin hopper adapted to hold a plurality of pins, a pin setting device adapted to receive pins from said hopper, plural means for selectively transferring a varying number of pins to said device and means for actuating said device to place the segregated pins in position for the bowler.

84. In a bowling alley, means for supporting pins in appropriately arranged positions at the set-up end of the alley, mechanisms for selectively controlling the discharge of variously arranged groups of pins from said arranging mechanism and mechanism for receiving said discharged pins and delivering them to the alley.

85. Bowling apparatus for use at a bowling alley comprising pin receiving hoppers, devices normally obstructing the emergence of a pin from said hoppers respectively, distinct means each adapted independently to control the position of one of said devices and mechanism for setting upon the alley the pins which were permitted to emerge.

86. In apparatus of the character described, the combination of a pin hopper, a movable table, a cradle pivoted on said table and adapted to receive a pin from said hopper, mechanism for controlling the transfer of a pin from said hopper to said cradle and mechanism for imparting both a straight line and a tilting action to said cradle to place a transferred pin in position for the bowler.

87. Bowling apparatus comprising the combination with an alley, of a series of pin hoppers, a pin-setting device including pin carriers movable between said hoppers and alley, distinct means for selectively discharging a pin from any desired number of said hoppers to a carrier, and means for actuating said device to bring pins into set-up position at said alley.

88. Bowling apparatus comprising the combination with an alley, of a series of pin hoppers adapted to contain a plurality of pins, a pin-setting device including pin carriers movable between said hoppers and alley, distinct separately operable means for discharging a pin from each of said hoppers to said carriers respectively, means for selectively controlling said distinct means and mechanism for actuating said device to bring pins into set-up position at said alley.

89. Bowling apparatus comprising a hopper adapted to contain a plurality of superposed pins, a pin setting contrivance including a cradle adapted gravitationally to receive pins from said hopper, a device normally obstructing the passage of pins from said hopper to said cradle, means for controlling the shift to unobstructing position of said device, the timely relation in position of said cradle to the discharge end of said hopper being contrived so that a pin occupying the cradle obstructs the emergence of the pin next above, beyond the range of control by said device, and means for actuating said pin-setting contrivance.

90. Bowling apparatus comprising a set of pin hoppers each adapted to contain a plurality of superposed pins, a pin setting contrivance including cradles adapted to assume a predetermined position of proximity to the discharge end of said hoppers and there adapted gravitationally to receive pins from said hoppers respectively, devices normally obstructing the passage of pins from said hoppers to said cradles respectively, selective means for controlling the shift to releasing position of any desired number of said devices, the timely relation in position of said cradles to the discharge ends of said hoppers respectively being contrived so that a pin occupying one cradle obstructs the fall of a superimposed pin therein beyond a point where it is still subject to the control of its particular device, a part of each of said selective controlling means which was caused to functionate being adapted to lock its cooperating device in its pin obstructing position and means for actuating said pin-setting contrivance.

91. In a bowling apparatus, mechanism for receiving, distributing and supporting pins and mechanisms adapted simultaneously to segregate varying numbers of pins while supported by said first mentioned mechanism.

92. In a bowling apparatus, a hopper for receiving and holding pins, selectively operable mechanisms for segregating varying numbers of pins from said hopper and mechanism for receiving and positioning the segregated pins into set-up position with respect to an alley.

Signed by me this 10th day of May, 1922.

LEWIS D. SCHAFFER.